(12) United States Patent
Kang et al.

(10) Patent No.: US 8,014,091 B2
(45) Date of Patent: Sep. 6, 2011

(54) CAMERA MODULE

(75) Inventors: Seong Ho Kang, Gyunggi-do (KR); Jae Ho Baik, Busan (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 12/385,623

(22) Filed: Apr. 14, 2009

(65) Prior Publication Data

US 2010/0053784 A1    Mar. 4, 2010

(30) Foreign Application Priority Data

Sep. 1, 2008 (KR) .................. 10-2008-0086054

(51) Int. Cl.
*G02B 7/02* (2006.01)

(52) U.S. Cl. ...................... 359/824; 359/819

(58) Field of Classification Search ......... 359/694–701, 359/811–824; 396/133, 529; 348/335, 340, 348/294, 374

See application file for complete search history.

(56) References Cited

U.S. PATENT DOCUMENTS

| 5,592,136 | A  | * | 1/1997  | Katagiri ................ 335/272 |
| 6,400,902 | B1 | * | 6/2002  | Usui ..................... 396/55 |
| 7,131,740 | B2 | * | 11/2006 | Nishioka ................ 359/862 |
| 7,528,885 | B2 | * | 5/2009  | Chou .................... 348/373 |
| 2008/0198249 | A1 | * | 8/2008 | Tanimura et al. ........... 348/294 |
| 2009/0180202 | A1 |   | 7/2009 | Knoedgen ................. 359/824 |
| 2010/0034531 | A1 | * | 2/2010 | Go ........................ 396/529 |

FOREIGN PATENT DOCUMENTS

| JP | 2007-193374 | 8/2007 |
| JP | 2008-76591 | 4/2008 |
| KR | 10-2005-0108481 | 11/2005 |

OTHER PUBLICATIONS

Korean Office Action issued on Dec. 8, 2009 in corresponding Korean Patent Application 10-2008-0086054.

* cited by examiner

*Primary Examiner* — Mohammed Hasan

(57) ABSTRACT

A camera module according to an aspect of the invention may include: a housing; a fixed unit fixed to the inside of the housing; a lens barrel provided in the housing and having at least one lens; and a moving unit moved and supported by the fixed unit by a predetermined magnetic force, and moving the lens barrel along an optical axis, such that driving accuracy and reliability can be increased when performing auto focus or zoom.

10 Claims, 2 Drawing Sheets

CAMERA MODULE

CROSS-REFERENCE TO RELATED APPLICATIONS

This application claims the priority of Korean Patent Application No. 2008-0086054 filed on Sep. 1, 2008, in the Korean Intellectual Property Office, the disclosure of which is incorporated herein by reference.

BACKGROUND OF THE INVENTION

1. Field of the Invention

The present invention relates to camera modules, and more particularly, to a camera module that is provided in a camera device, such as a small electronic device.

2. Description of the Related Art

In general, camera modules are small in size, and have been applied to portable mobile communication apparatuses, such as camera phones, PDAs, and smart phones, and various types of IT equipment. Recently, as these apparatuses and equipment have been reduced in size, thickness, and weight, the size of the camera modules has been correspondingly reduced.

This camera module is being manufactured, including an image sensor, such as a charge coupled device (CCD) or a complementary metal-oxide semiconductor (CMOS), as a main component. The camera module collects light from an image of an object by using the image sensor, stores data in a memory of a device, and outputs the stored data as an image through a display medium, such as an LCD or a PC monitor, which is provided in the device.

When a camera module is mounted onto a small electronic device, such as a mobile communication terminal, the camera module needs to have enhanced features such as autofocus and zoom.

The camera module performs the autofocus or zoom function by moving a lens barrel having at least one lens along an optical axis by a predetermined distance.

When the lens barrel is moved, a housing and the lens barrel are coupled to each other by using an elastic member, such as a plate spring or an elastic wire, and the lens barrel is supported using the elastic member.

However, as the camera module has been reduced in size and increased in pixels, an extended driving distance can be implemented by a smaller amount of current, and the strength of the elastic member needs to be smaller.

However, the reduction in strength of the elastic member causes serious problems, such as a dropping of the lens barrel and misalignment of the optical axis.

SUMMARY OF THE INVENTION

An aspect of the present invention provides a camera module that can improve movement accuracy and driving reliability when performing autofocus and zoom by using a structure providing a force to reliably support a lens barrel to correct an error caused when driving the lens barrel.

According to an aspect of the present invention, there is provided a camera module including: a housing; a fixed unit fixed to the inside of the housing; a lens barrel provided in the housing and having at least one lens; and a moving unit moved and supported by the fixed unit by a predetermined magnetic force, and moving the lens barrel along an optical axis.

The fixed unit may include a fixed support member fixed to the inside of the housing, a coil member provided at one side of the fixed support member, and a magnetic member provided at the other side of the fixed support member, and the moving unit may include a moving support member slidable relative to the fixed support member, and a magnet member supported closely by the moving support member and exerting a magnetic force on the magnetic member, and moving the moving support member by electromagnetic interaction with the coil member.

The fixed unit may include a fixed support member fixed to the inside of the housing, and a magnet member provided at one side of the fixed support member, and the moving unit may include a moving support member slidable relative to the fixed support member, a magnetic member supported close by the moving support member and causing the magnet member to generate a magnetic force, and a coil member moving the moving support member by electromagnetic interaction with the magnet member.

The camera module may further include: a first support surface provided on the fixed support member; a second support surface provided on the moving support member and facing the first support surface; and a ball member provided between the first support surface and the second support surface and, supporting the movement of the moving support member.

A guide groove may be provided in one of the first support surface and the second support surface, receive the ball member, and guide the rotation of the ball member, and the ball member received in the guide groove may be rotated by contact resistance with the other support surface.

The camera module may further include a Hall sensor provided at one of the fixed support member and the moving support member, facing the magnet member provided at the other support member, and generating a signal indicating a moving position of the moving support member by the magnetic force of the magnet member.

The fixed support member may include a receiving groove provided in a surface of the fixed support member facing the magnet member fixed to the moving support member to fix the coil member into the receiving groove, and the fixed support member further may include a Hall sensor fixed into the receiving groove and generating different signals according to positions of the magnet member to detect a moving position of the moving support member.

The moving support member may include a receiving groove provided in a surface of the moving support member facing the magnet member fixed to the fixed support member, and may further include a Hall sensor fixed into the receiving groove and generating different signals according to positions of the magnet member to detect a moving position of the moving support member.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

The invention may however be embodied in many different forms and should not be construed as limited to the embodiments set forth herein. Rather, these embodiments are provided so that this disclosure will be thorough and complete, and will fully convey the scope of the invention to those skilled in the art.

The invention basically relates to a camera module that can move a lens module by a driving force generated by electromagnetic interaction between a magnet and a coil.

As the magnet generates a predetermined magnetic field, and a current flows through the coil across the magnetic fields, a predetermined force is applied according to Fleming's left-hand rule.

The force allows the camera module to perform autofocus and zoom while moving the lens module. This type of camera module is called a voice coil type actuator (VCA) camera module.

In this embodiment, a magnet member serves as the magnet, and a coil member serves as the coil. Further, the magnet member performs various functions at the same time, which will be described below in detail.

Figure 1:
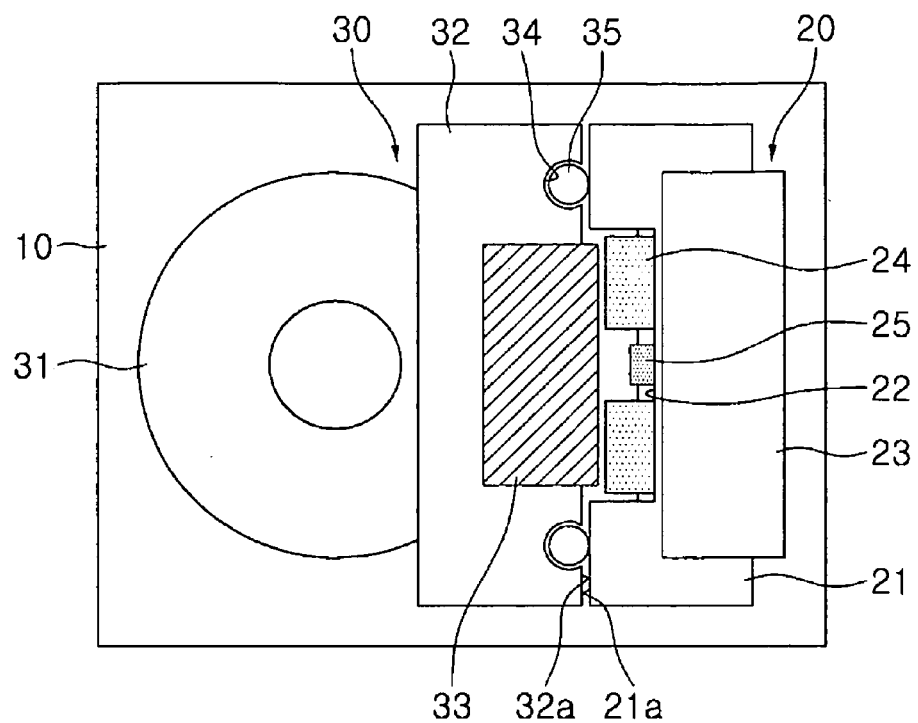
FIG. 1 is a schematic view illustrating an upper cross section of a camera module according to an exemplary embodiment of the present invention.

First, a camera module according to an exemplary embodiment will be described in brief with reference to FIG. 1. FIG. 1 is a schematic view illustrating an upper cross section of a camera module according to an exemplary embodiment of the invention.

As shown in FIG. 1, a camera module according to this embodiment includes a housing 10, a fixed unit 20, and a moving unit 30.

The fixed unit 20 is fixed to one side of the inside of the housing 10. While the moving unit 30 slides relative to the fixed unit 20, and moves the lens barrel 31 along an optical axis, autofocus or zoom function is performed.

The lens barrel 31 is a structure that has at least one lens. The lens barrel 31 and the moving unit 20 may be formed in one piece. Alternatively, the lens barrel 31 may be formed integrally with the moving unit 20.

The fixed unit 20 includes a fixed support member 21 that is fixed to one side of the inside of the housing 10, a magnetic member 23 that is mounted onto one side of the fixed support member 21, and coil members 24 that are mounted onto the other side of the fixed support member 21.

The moving unit 30 includes a moving support member 32 and a magnet member 33. The moving support member 32 is coupled to or formed integrally with the lens barrel 31. The magnet member 33 is provided on the moving support member 32 that faces the fixed support member 21.

Preferably, the magnet member 33 of the moving unit 30 and the coil members 24 of the fixed unit 20 are separated from each other by a predetermined distance, and face each other.

The magnetic member 23 is preferably provided at a rear surface of the coil member 24 so that the magnet member 33 exerts a magnetic force on the magnetic member 23.

Preferably, while a receiving groove 22 is provided in the fixed support member 21 that faces the moving support member 32, the coil member 24 is received in the receiving groove 22.

A Hall sensor 25 is preferably provided in the receiving groove 22 such that the Hall sensor 25 faces the magnet member 33. Preferably, the coil members 24 are provided to surround the Hall sensor 25.

As shown in FIG. 1, the fixed support member 21 and the moving support member 32 are separated from each other and face each other. A first support surface 21a of the fixed support member 21 faces the moving support member 32, and a second support surface 32a of the moving support member 32 faces the fixed support member 21.

Preferably, as shown in FIG. 1, guide grooves 34 are formed in the second support surface 32a, and ball members 35 are received in the guide grooves 34, so that the ball members 35 make contact with the first support surface 21a.

Therefore, when the moving support member 32 moves, the ball members 35 are rotated through friction with the first support surface 21a, and the guide groove 34 guides the rotation of the ball member 35.

In this embodiment, illustrated in FIG. 1, the guide grooves 34 are provided in the second support surface 32a, the ball members 35 are received in the guide grooves 34, and the ball members 35 make contact with the first support surface 21a. However, the invention is not limited thereto. The guide grooves 34 may be formed in the first support surface 21a, and the ball members 35 may be received in the guide grooves 34 such that the ball members 35 may be in contact with the second support surface 32a.

The operation and effect of the camera module according to the embodiment, illustrated in FIG. 1, will be described with reference to FIGS. 2 and 3.

Figure 2:
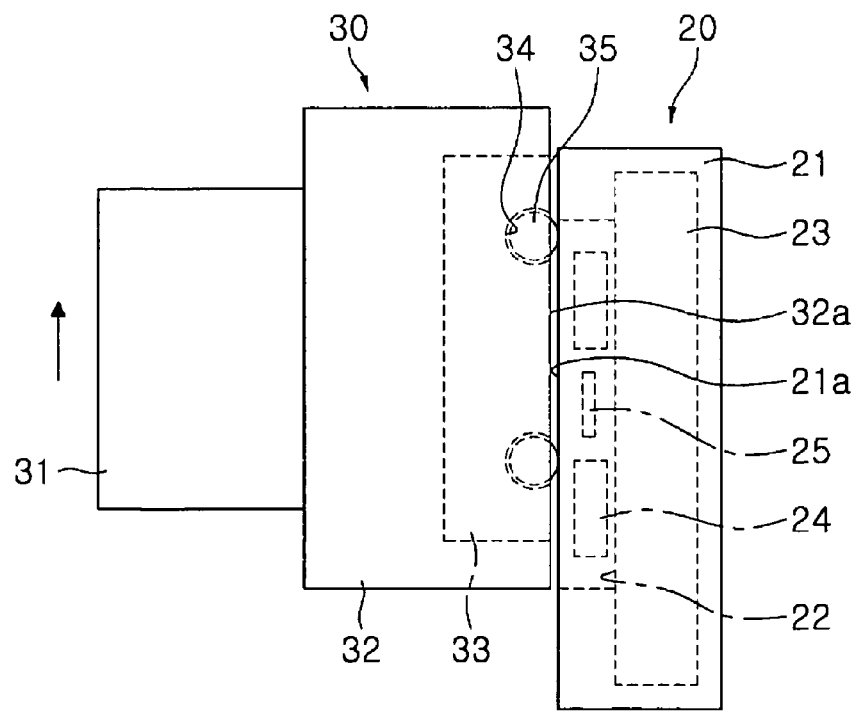
FIG. 2 is a side view illustrating a case in which a moving unit 30 of the camera module, shown in FIG. 1, moves up along an optical axis.

FIG. 2 illustrates a case in which the moving unit 30 moves up along the optical axis. FIG. 3 illustrates a case in which the moving unit 30 moves down along the optical axis.

Figure 3:
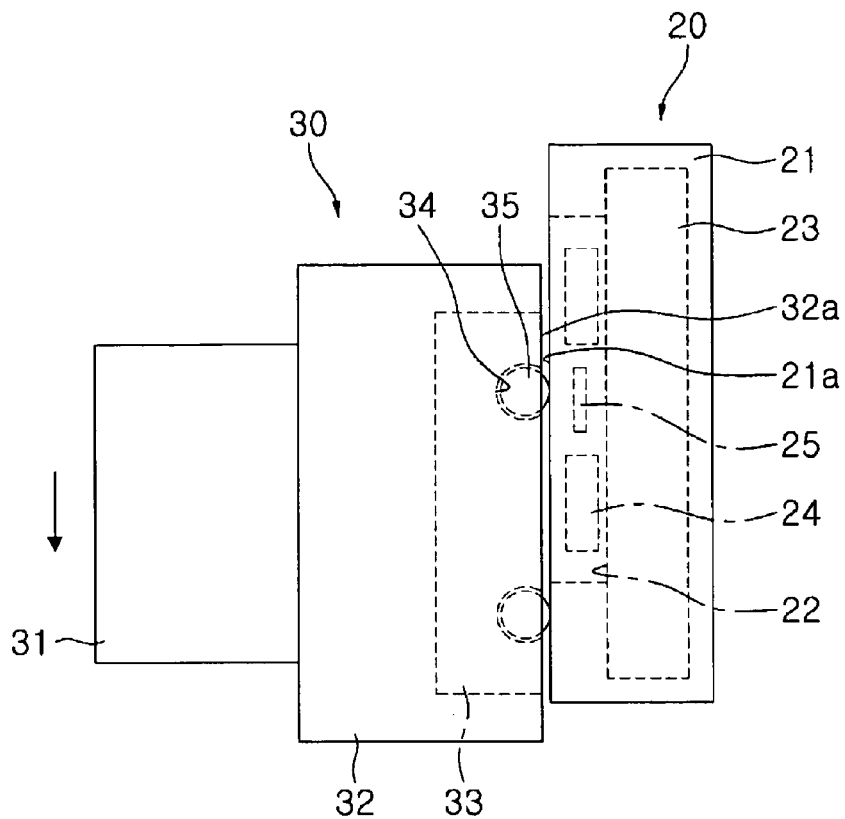
FIG. 3 is a side view illustrating a case in which the moving unit 30 of the camera module, shown in FIG. 1, moves down along an optical axis.

As shown in FIGS. 2 and 3, the magnet member 33 provided in the moving support member 32 exerts a magnetic force on the magnetic member 23 provided in the fixed support member 21 such that the magnet member 33 moves toward the magnetic member 23. Further, the ball member 35 provided between the moving support member 32 and the fixed support member 21 allows the moving support member 32 to be supported by the fixed support member 21 at a predetermined distance from the fixed support member 21.

Here, the magnet member 33 may include any member as long as it produces a magnetic force. The magnetic member 23 includes any member formed of, for example, metal that performs a magnetic interaction with the magnet member 33.

The ball member 35, received in the guide groove 34 provided in the second support surface 32a of the moving support member 32, is partially exposed outside the guide groove 34 and adheres to the first support surface 21a of the fixed support member 21. The ball member 35 is rotated through friction between the first support surface 21a and the ball member 35 when the moving support member 32 moves.

The ball member 35 allows smooth movement of the moving support member 32. Further, the ball member 35 guides the movement of the moving support member 32 and supports the moving support member 32.

The coil member 24 provided in the receiving groove 22 of the fixed support member 21 electromagnetically interacts with the magnet member 33 to produce a driving force by which the moving support member 32 can move.

The magnetic force exerted by the magnet member 33 and the Lorentz force according to Fleming's left-hand rule generated by a current flowing through the coil member 24 cause the moving support member 32 to move.

The Hall sensor 25 provided in the receiving groove 22 of the fixed support member 21 receives the magnetic force from the magnet member 33 to generate a predetermined signal, so that the moving position of the moving support member 32 can be accurately controlled.

That is, while the moving support member 32 moves, the Hall sensor 25 generates different signals at varying positions of the magnet member 33. By using the signals, it is possible to accurately detect where the moving support member 32 is located, thereby controlling the position of the moving support member 32.

The magnet member 33 has a predetermined length along a longitudinal direction of the moving support member 32. Since individual parts of the magnet member 33 produce different magnetic fields, the Hall sensor 25 generates different signals according to the magnetic field intensity of the parts of the magnet member 33.

As shown in FIGS. 2 and 3, signal values of the Hall sensor 25 are determined according to the upper and lower limits of movement of the moving support member 32 such that the upper and lower limits can be accurately controlled when the moving support member 32 moves.

Further, the movement of the moving support member 32 may be divided into a plurality of sections, and signal values of the Hall sensor 25 are determined according to the sections, so that the movement of the moving support member 32 is controlled according to each of the sections.

Figure 4:
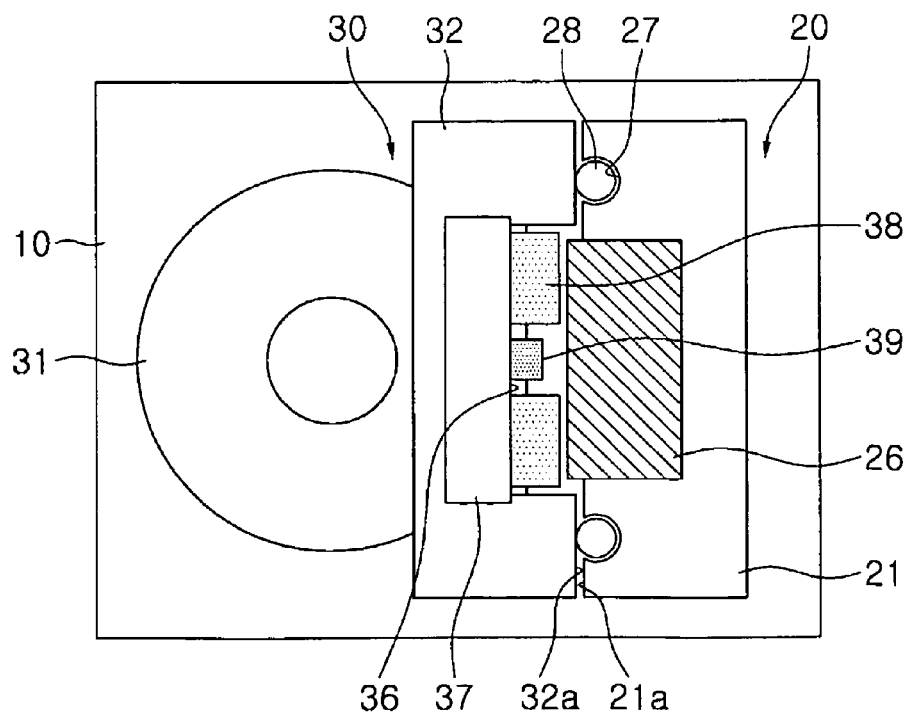
FIG. 4 is a schematic view illustrating an upper cross section of a camera module according to another exemplary embodiment of the present invention.

A camera module according to another exemplary embodiment of the invention will be described with reference to FIG. 4. FIG. 4 is a schematic view illustrating an upper cross section of a camera module according to another exemplary embodiment of the invention.

As shown in FIG. 4, a camera module according to this embodiment includes a housing 10, a fixed unit 20, and a moving unit 30.

The fixed unit 20 includes a fixed support member 21 and a magnet member 26. The moving unit 30 includes a moving support member 32, a magnetic member 37, a coil member 38, and a Hall sensor 39. The lens barrel 31 is formed integrally with the moving support member 32.

A receiving groove 36 is formed in the moving support member 32. The magnetic member 37, the coil member 38, and the Hall sensor 39 are fixed to the inside of the receiving groove 36.

That is, while the magnet member of the camera module according to the embodiment, illustrated in FIG. 1, is provided in the moving support member 32, the magnet member of the camera module according to the embodiment, shown in FIG. 4, is provided in the fixed support member 21.

Further, while the magnetic member, the coil member, and the Hall sensor are provided on the fixed support member 21 of the camera module according to the embodiment, illustrated in FIG. 1, they are provided on the moving support member 32 of the camera module according to the embodiment, illustrated in FIG. 4.

The magnet member 26 is provided on the fixed support member 21 that faces the receiving groove 36 of the moving support member 32. The coil member 38 and the Hall sensor 39 are separated from the magnet member 26 by a predetermined distance and face each other.

Preferably, the magnetic member 37 is provided in front of the coil member 38 to easily receive a magnetic force exerted from the magnet member 26.

The fixed support member 21 and the moving support member 32 are separated from each other by a predetermined distance and face each other. A first support surface 21a of the fixed support member 21 faces the moving support member 32, and a second support surface 32a of the moving support member 32 faces the fixed support member 21.

Preferably, as shown in FIG. 4, guide grooves 27 are formed in the first support surface 21a, ball members 28 are received in the guide grooves 27, and the ball members 28 are in contact with the second support surface 32a.

Therefore, when the moving support member 32 moves, the ball members 28 are rotated through friction with the second support surface 32a, and the guide grooves 27 guide the rotation of the ball members 28.

In the embodiment, illustrated in FIG. 4, the guide grooves 27 are provided in the first support surface 21a, the ball members 28 are received in the guide grooves 27, and the ball members 28 make contact with the second support surface 32a. However, the invention is not limited thereto. The guide grooves 27 may be formed in the second support surface 32a, and the ball members 28 may be received in the guide grooves 27 such that the ball member 28 may make contact with the first support surface 21a.

As described above, in the camera module according to the embodiment, illustrated in FIG. 4, the magnet member 26 generates a magnetic force to attract the magnetic member 37 such that the moving support member 32 is supported by the fixed support member 21 while keeping a predetermined distance from the fixed support member 21.

The moving support member 32 can move along the optical axis by the electromagnetic interaction between the magnet member 26 and the coil member 38. The Hall sensor 39 generates different signals according to varying positions of the magnet member 26 to thereby detect the moving position of the moving support member 32.

The operation and effect of the camera module, illustrated in FIG. 4, is substantially the same as those of the camera module according to the embodiment, illustrated in FIGS. 1, 2, and 3. Thus, a detailed description thereof will be omitted.

As set forth above, according to exemplary embodiments of the invention, as a moving unit formed integrally with a lens barrel is supported by a fixed unit by a magnetic force, and moves along an optical axis, a camera module can increase driving accuracy and reliability when performing auto focus or zoom function.

Further, the movement of the moving unit with respect to the fixed unit is guided by using a ball member to reduce friction during driving, and the moving position of the moving unit can be accurately detected by using a Hall sensor.

While the present invention has been shown and described in connection with the exemplary embodiments, it will be apparent to those skilled in the art that modifications and variations can be made without departing from the spirit and scope of the invention as defined by the appended claims.

What is claimed is:

1. A camera module comprising:
   a housing;
   a fixed unit fixed to an inside of the housing,
   the fixed unit comprising a fixed support member fixed to the inside of the housing, a coil member provided at one side of the fixed support member, and a magnetic member provided at the other side of the fixed support member;
   a lens barrel provided in the housing and having at least one lens; and
   a moving unit moved and supported by the fixed unit by a predetermined magnetic force, and moving the lens barrel along an optical axis, the moving unit comprising a moving support member slidable relative to the fixed support member, and a magnet member supported closely by the moving support member and exerting a magnetic force on the magnetic member, and moving the moving support member by electromagnetic interaction with the coil member.

2. The camera module of claim 1, further comprising:
a first support surface provided on the fixed support member;
a second support surface provided on the moving support member and facing the first support surface; and
a ball member provided between the first support surface and the second support surface and, supporting the movement of the moving support member.

3. The camera module of claim 1, further comprising a Hall sensor provided at one of the fixed support member and the moving support member, facing the magnet member provided at the other support member, and generating a signal indicating a moving position of the moving support member by the magnetic force of the magnet member.

4. The camera module of claim 1, wherein the fixed support member comprises a receiving groove provided in a surface of the fixed support member facing the magnet member fixed to the moving support member to fix the coil member into the receiving groove, and
the fixed support member further comprises a Hall sensor fixed into the receiving groove and generating different signals according to positions of the magnet member to detect a moving position of the moving support member.

5. The camera module of claim 1, wherein the fixed support member comprises a receiving groove provided in a surface of the fixed support member facing the magnet member fixed to the moving support member to fix the coil member into the receiving groove.

6. A camera module comprising:
a housing;
a fixed unit fixed to an inside of the housing;
the fixed unit comprising a fixed support member fixed to the inside of the housing, and a magnet member provided at one side of the fixed support member;
a lens barrel provided in the housing and having at least one lens; and
a moving unit moved and supported by the fixed unit by a predetermined magnetic force, and moving the lens barrel along an optical axis,
the moving unit comprising a moving support member slidable relative to the fixed support member, a magnetic member supported close by the moving support member and causing the magnet member to generate a magnetic force, and a coil member moving the moving support member by electromagnetic interaction with the magnet member.

7. The camera module of claim 6, further comprising:
a first support surface provided on the fixed support member;
a second support surface provided on the moving support member and facing the first support surface; and
a ball member provided between the first support surface and the second support surface and, supporting the movement of the moving support member.

8. The camera module of claim 7, wherein a guide groove is provided in one of the first support surface and the second support surface, receives the ball member, and guides the rotation of the ball member, and
the ball member received in the guide groove is rotated by contact resistance with the other support surface.

9. The camera module of claim 6, further comprising a Hall sensor provided at one of the fixed support member and the moving support member, facing the magnet member provided at the other support member, and generating a signal indicating a moving position of the moving support member by the magnetic force of the magnet member.

10. The camera module of claim 6, wherein the moving support member comprises a receiving groove provided in a surface of the moving support member facing the magnet member fixed to the fixed support member, and further comprises a Hall sensor fixed into the receiving groove and generating different signals according to positions of the magnet member to detect a moving position of the moving support member.

* * * * *